G. WESTINGHOUSE, DEC'D.
H. H. WESTINGHOUSE, C. A. TERRY AND W. D. UPTEGRAFF, EXECUTORS.
ELECTRIC RAILWAY.
APPLICATION FILED AUG. 17, 1904.

1,119,913.

Patented Dec. 8, 1914.
3 SHEETS—SHEET 1.

WITNESSES:
C. L. Belcher
Fred. H. Miller

INVENTOR
George Westinghouse
BY
ATTORNEY

G. WESTINGHOUSE, DEC'D.
H. H. WESTINGHOUSE, C A. TERRY AND W. D. UPTEGRAFF, EXECUTORS.
ELECTRIC RAILWAY.
APPLICATION FILED AUG. 17, 1904.

1,119,913.

Patented Dec. 8, 1914.
3 SHEETS—SHEET 2.

WITNESSES:
C. L. Belcher
Fred. H. Miller

INVENTOR
George Westinghouse
BY
Wesley G. Carr
ATTORNEY

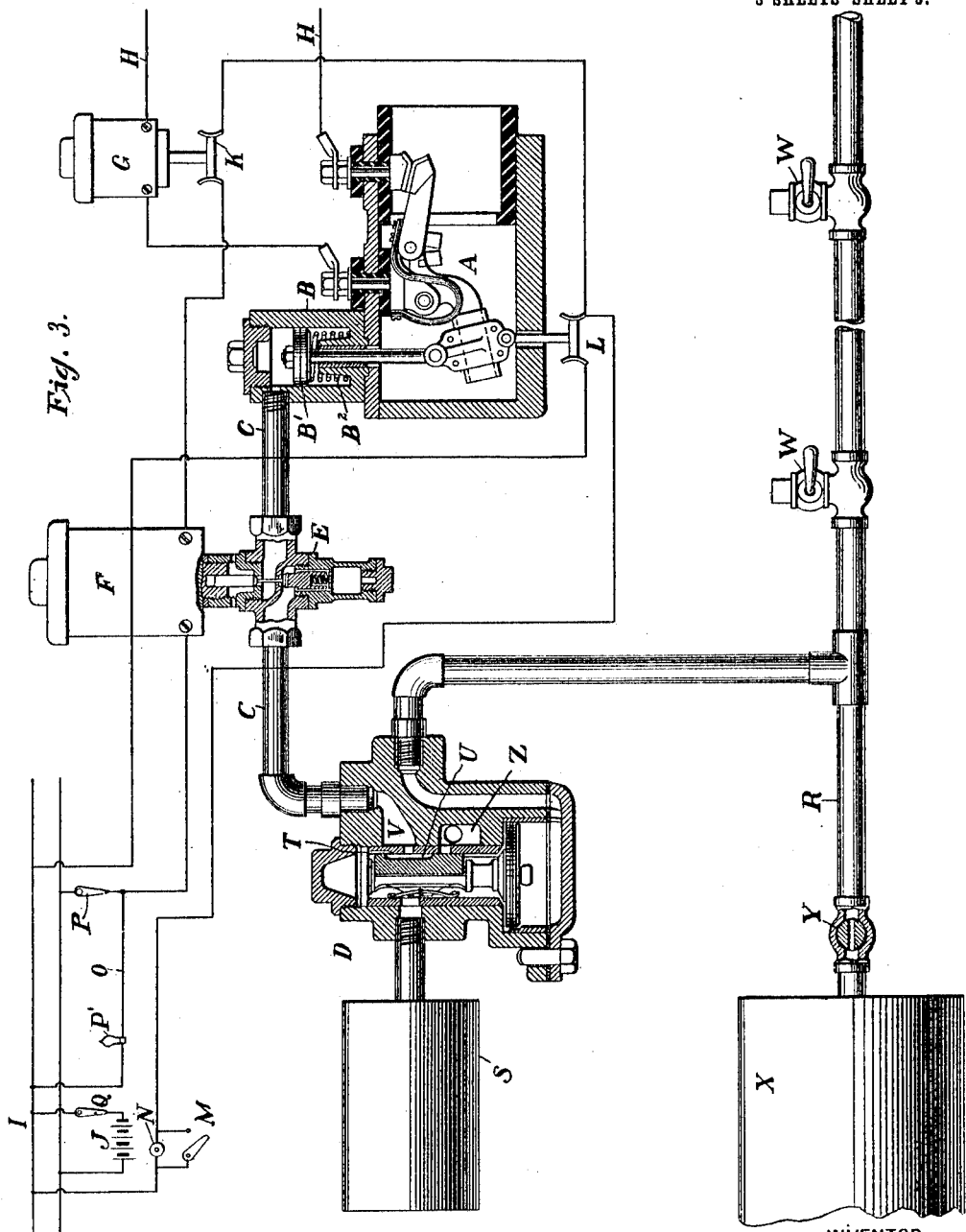

UNITED STATES PATENT OFFICE.

GEORGE WESTINGHOUSE, OF PITTSBURGH, PENNSYLVANIA; HENRY HERMAN WESTINGHOUSE, CHARLES A. TERRY, AND WALTER D. UPTEGRAFF, EXECUTORS OF SAID GEORGE WESTINGHOUSE, DECEASED, ASSIGNORS TO WESTINGHOUSE ELECTRIC AND MANUFACTURING COMPANY, OF PITTSBURGH, PENNSYLVANIA, A CORPORATION OF PENNSYLVANIA.

ELECTRIC RAILWAY.

1,119,913.     Specification of Letters Patent.     Patented Dec. 8, 1914.

Application filed August 17, 1904. Serial No. 221,092.

*To all whom it may concern:*

Be it known that I, GEORGE WESTINGHOUSE, a citizen of the United States, and a resident of Pittsburgh, in the county of Allegheny and State of Pennsylvania, have invented a new and useful Improvement in Electric Railways, of which the following is a specification.

My invention relates to electric railways and particularly to those which are located in tunnels.

One object of my invention is to provide means whereby the short circuiting of the main conductors or cables by reason of derailment of a train or from any other accident may be prevented, and another object of my invention is to provide means for interrupting the power circuit and thereby electrically isolating a considerable length of the tunnel in case an accidental short circuit occurs.

It has heretofore been proposed to so construct and equip underground electric railways that the electric cables or feeders carrying the low voltage currents shall be supported on or near the roadway and track rails, and in cases where high tension cables have been required, it has been proposed to support them along the upper portion or side of the tunnel. It will be readily understood that, on account of the small space that is available in an ordinary tunnel, if a train is derailed or a breakdown occurs from any other cause, damage to either the low or high tension conductors, or both, is very likely to result and that such damage will probably cause fires or other serious injury to the passengers and to the property, in case the conductors are arranged as above indicated.

In order to avoid the possibility of damages such as those just referred to, I have devised the means shown in the accompanying drawings, in which—

Figure 1:
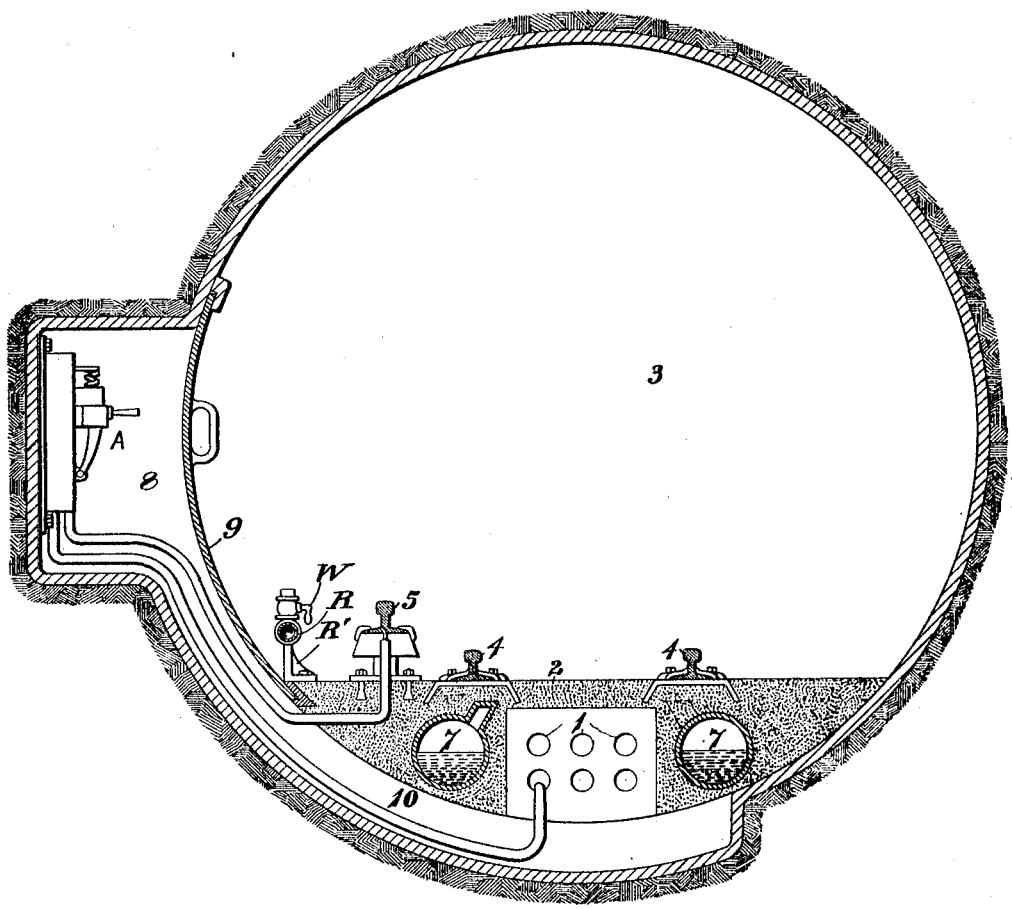
Figure 2:
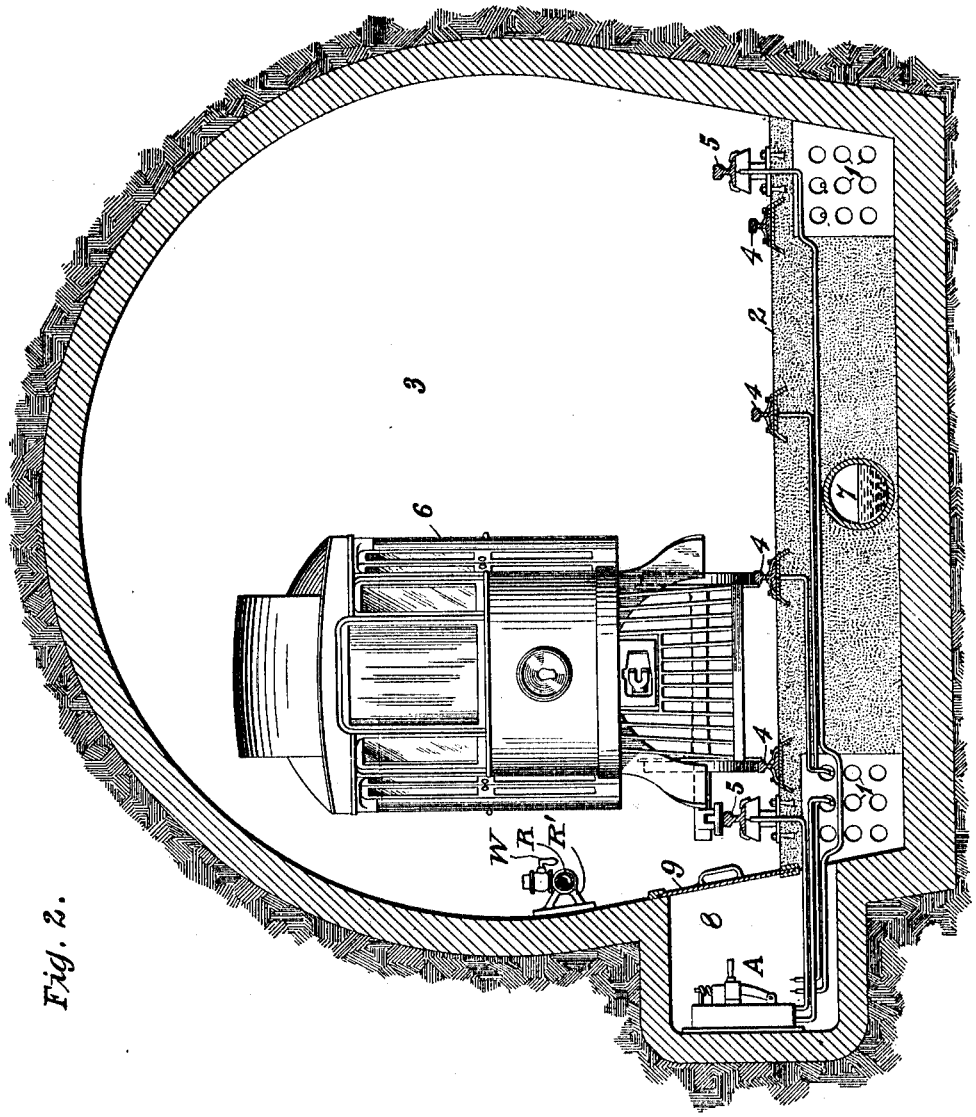

Figure 1 is a cross-sectional view of a tunnel equipped with a safety apparatus that I propose to use. Fig. 2 is a cross-sectional view of a tunnel equipped with apparatus of modified construction, and Fig. 3 is a view, partially in section and partially diagrammatic, of my circuit-interrupting system and apparatus.

According to my invention, all of the electric conductors, are all laid in ducts 1 beneath the surface of the road bed 2, and the interior of the tunnel 3 is left entirely clear from all apparatus, except the road bed track rails 4, the pipe line R, and the rail or rails 5 from which the propelling energy is conducted to the motors on the car or train 6. The position of the cable ducts 1 may be varied, according to circumstances; where a single line of rails 4 only is provided, the ducts will preferably be laid between the rails and between two drains 7, as indicated in Fig. 1. In case the tunnel is provided with two tracks, however, as indicated in Fig. 2, the drain 7 may be laid midway between the two tracks, and the two ducts 1 may be laid between the rails of each track or at the outside of the rails, as is indicated in Fig. 2.

The conductors may be arranged in the ducts 1 to suit the conditions of any particular installation, but, in general, it will probably be found desirable to place the low tension feeders in the ducts at one side of the tunnel and the high tension cables in the ducts at the other side. Whatever may be the arrangement of cables, feeders, etc., it will be readily seen that, by reason of the location of the ducts, no accident to the train could, by any possibility, bring either the train or the passengers into contact with such conductors.

In order to cut off the current from any desired length of conductors in case of accident, I provide a series of circuit breakers A, it being understood that the service conductors will be divided into sections of the desired length by means of the circuit breakers, so that in case a short circuit occurs on any section that section will be immediately cut out. The circuit breakers A are preferably located in chambers 8 at the side of the tunnel, said chambers being provided with covers 9 which are practically flush with the tunnel side. Circumferential passages 10 are provided, preferably near the interior surface of the tunnel, which connect the chambers 8 with the ducts 1, and in these passages are located the leads which connect the circuit breakers with the cables and with the rails 5.

The circuit breakers A may be of any suitable type and are preferably provided with means whereby they may be reset, when desired, from a distant point. The circuit breakers may be arranged to control the current supplied to an entire block or signaling section, in which case there will be one breaker provided for each section of the line, or they may be spaced at suitable intervals, for instance, at one train length along the line, independent of the location of the signals. The circuit breakers may be arranged in the low tension feeders or at the sub-stations in the main feeder circuits, or at both places, if desired.

In view of the large currents with which the circuit breakers are required to deal, I may provide means for operating them pneumatically, as indicated in Fig. 3 of the drawings. As here indicated, the circuit breaker A is closed and held in closed position by means of compressed air in a cylinder B acting upon its piston B' and is opened by means of a spring B² when the air is exhausted from the cylinder.

The compressed air for operating the piston B' is admitted from a pipe C, by means of a valve E, when the electro-magnet F, the armature of which is connected to the valve E, is energized; and the air is exhausted from the cylinder when the magnet F is deënergized, this construction of apparatus and its operation being well known in the art. The electro-magnet F is connected in circuit with a switch K that is operated by a magnet G in the feeder circuit H, so that when the current in the said feeder circuit exceeds a predetermined amount, the switch K will be opened and the governing electromagnet F deënergized. When this action takes place, the cylinder B will be exhausted and the circuit breaker will be opened by means of the spring B².

In order to prevent reënergizing of the magnet F when the feeder circuit is broken by the circuit breaker, a switch L is provided, which constitutes an electric interlock, in the circuit of the governing magnet F, this switch being connected with the circuit breaker in such manner that as long as the circuit breaker is in its closed position it remains closed, but it is opened when the circuit breaker opens.

For the purpose of resetting the circuit breaker from a distant point, for example, the nearest signal box station or sub-station I, the governing electro-magnet F is included in the circuit of a switch M at the sub-station, by means of which it may be connected to the battery J when desired, and be energized to permit a supply of compressed air from the pipe C to the pneumatic cylinder B of the circuit breaker. The circuit breaker A will remain open until the governing circuit is completed by closing the switch M which is located in the signal box I.

A device N, taking a small amount of current, may be inserted to give warning when the circuit breaker is open. As shown, one terminal of the device N is connected through one stationary contact terminal of the switch L, the switch K, the magnet and the switch P to one terminal of the battery J and its other terminal is connected through the switch Q to the other terminal of the battery. When the circuit breaker A is closed, the device N is short circuited by the switch L, but when the breaker is open the switch L is open and the device N takes current from the battery.

If it be desired to open the circuit breaker A from the signal box a switch P may be opened which interrupts the circuit of the magnet F, a wire O being provided in multiple with said magnet in which is located a signal lamp P'. With this arrangement, if the switch P is opened, the circuit breaker will be opened and the signal lamp P' will be extinguished and will afford a visible indication of that condition. The circuit breakers in any given section may all be opened by opening the switch Q in the battery circuit.

As here indicated, the compressed air is supplied from the main pipe R, which extends through the tunnel and is supported by brackets R' so that it is readily accessible, through a valve D of special construction, to which is also connected a supplemental reservoir S. With the valve in the position indicated in the drawing, air will be admitted to the pipe C from the reservoir S through the channel formed by the passages T, U and V. The pipe R is provided at intervals with manually operated valves W, so that in case an accident occurs along the line, any one of these valves may be opened by an attendant. Whenever any one of these valves is opened, the reduction in pressure in the pipe R, which is supplied from the main reservoir X through a restricted passage Y, will cause the piston of the valve D to move downward and thus cut off the reservoir S from communication with the pipe R and the pipe C and will vent the pipe C, through the channel formed by the spaces V, U and Z, to the atmosphere. This will serve to effect the opening of all the circuit breakers and these cannot be again closed until the open valve W has been closed. When such valve is closed, the pistons of the valves D will be raised, thus permitting the circuit breakers to be again closed, provided the controlling or governing magnet F is energized.

The valve D cuts off the reservoir S from communication with pipes R and C because downward movement of the valve cuts off the passage T from the passage V and, at the same time, the piston portion of the valve cuts off that portion of the valve chamber which is above the piston from the lower portion to which the pipe R is connected.

By employing cocks W in connection with the main air pipe R, the circuit breaker may be operated to open the feeder circuit, or all the circuit breakers in the tunnel may be operated, even when no short circuit occurs, this being sometimes desirable in order to enable persons to walk along the tunnel in safety.

It will be understood that my invention is not limited to the use of compressed fluid, since other well known agents are available for use in the system to effect substantially the same results.

I claim as my invention:

1. An underground railway comprising ducts beneath the road bed, closed chambers at intervals along the tunnel, line conductors located in said ducts, circuit breakers therefor located in said chambers, electro-pneumatic means for closing the said breakers, and pneumatic means for opening said breakers when desired.

2. An underground or tunnel electric railway having a series of chambers in one of its side walls, removable doors for said chambers, circuit-breakers located in said chambers, pneumatic means for closing said breakers, electro-magnetic means for controlling the application of pneumatic pressure, and governing means for said electro-magnetic means.

3. A tunnel electric railway having closed chambers at one side of the tunnel, a series of circuit breakers located therein, pneumatically-actuated means for closing said breakers, and both manually-operated and electrically-operated means for controlling application of pneumatic pressure.

4. An underground railway having ducts, line conductors located therein, a plurality of closed chambers at intervals along the tunnel, circuit breakers located in said chambers, electro-pneumatic means for closing said breakers, and pneumatic means for opening said breakers, when desired.

5. In an electric railway, the combination with a contact conductor and a line conductor for supplying energy thereto, of circuit breakers for said line conductor, electro-pneumatic means for closing said breakers, and pneumatic means for opening the same, when desired.

6. In an electric railway, the combination with a contact conductor and a line conductor for supplying energy thereto, of circuit breakers for said line conductor, pneumatically actuated means for closing said breakers, and manually operated and electrically operated means for controlling the application of the pneumatic pressure.

In testimony whereof, I have hereunto subscribed my name this 11th day of August, 1904.

GEO. WESTINGHOUSE.

Witnesses:
CHARLES A. TERRY,
THOS. H. BROWN.

Copies of this patent may be obtained for five cents each, by addressing the "Commissioner of Patents, Washington, D. C."